United States Patent Office 3,061,628
Patented Oct. 30, 1962

3,061,628
PROCESS AND PREPARATION OF AMINO NITRILES AND ACETIC ACIDS
John J. Singer, Jr., Westboro, Mass., and Mark Weisberg, Providence, R. I., assignors to Hampshire Chemical Corporation, Nashua, N.H., a corporation of Delaware
No Drawing. Filed Sept. 12, 1958, Ser. No. 760,551
7 Claims. (Cl. 260—465.5)

This invention relates to the preparation of amino nitriles and acids and, in particular, it is concerned with a process adaptable to continuous operation, if so desired, the operation being valuable for the formation of nitriloacetic acid nitriles as precursors of chelating agents, which are formed by hydrolysis of the nitriles to the acid form.

In our pending application, Serial No. 618,194, now issued as United States Patent 2,855,428, we have described a process for the preparation of amino nitriles based upon the reaction of primary or secondary amine compounds, i.e., those having replaceable hydrogens attached directly to the nitrogens, with formaldehyde and liquid hydrogen cyanide in a reaction medium, such that the nitrile is formed directly.

In conventional reactions for the preparation of nitriloacetic acids ammonia will be carboxymethylated to produce the triacetic acid. Also where a substituted nitrilo acetic acid is desired, a substituted starting amine will be used. The disadvantage of such a preparation is, of course, that ammonia is a starting material of extremely low boiling point and offers manipulation difficulties in the process.

We have discovered that some amino nitrile compounds may be formed from the reaction product of an amine containing no replaceable hydrogens attached to the nitrogens or from the reaction product of ammonia and formaldehyde.

Yields of acetonitrile compounds prepared by reacting the amine-aldehyde condensation product with additional aldehyde and hydrogen cyanide or hydrogen cyanide and acid are superior in many cases, both in quantity obtained and in purity of product, to acetonitriles prepared by bringing the separate reactants together into a reaction mixture where the condensation may be considered a step in the reaction. This appears to be attributable to the fact that by the separate formation of amine-aldehyde condensation product it is possible to direct the final course of reaction more optimally in the direction desired. Variables such as reactants and proportions are brought under better control in this complicated reaction mechanism.

For example, when ammonia is condensed with formaldehyde hexamethylenetetramine is produced. In fact, the reaction is quantitative when gaseous ammonia is passed into strong formaldehyde solution. This reaction is actually a basis for a method of analysis. However, when the dilutions of formaldehyde are extreme or when large excesses of ammonia are present, as, for example, when formaldehyde is added to ammonia and ammonium hydroxide, mixtures of compounds which may or may not ultimately be converted to hexamethylenetetramine are formed.

The process of this invention is characterized by the use of condensate having no replaceable hydrogen atoms attached to the nitrogens, such as hexamethylenetetramine, to react with formaldehyde (or a formaldehyde yielding material such as paraformaldehyde) and hydrogen cyanide at a temperature of the order of about 35° to 100° C. at a strong acid pH which, however, may be in the range from about 0 to about 6.5, as a result of which it is possible to prepare some acetonitriles in essentially quantitative yield, when by other procedures yields are much lower.

Hexamethylenetetramine, a typical reactant for our process, is a compound condensate resulting from reaction between formaldehyde and ammonia to form a polycyclic compound made up of methylene groups bridged by nitrogen atoms into a cross-linked 6-member ring. The exact mechanism of the reaction by which, under the conditions characterizing our process, the compound is converted into nitrilotriacetonitrile, is somewhat obscure, but we have found it to be a remarkably useful starting reactant for the preparation of this useful chelating agent.

Thus, in a typical operation in accordance with our process, an aqueous solution of hexamethylenetetramine, for example, is added to an aqueous solution containing hydrogen cyanide, formaldehyde and sufficient acid to maintain the pH of the reaction mixture preferably below 1. The reaction temperature quite useful for the formation of crystals of the nitrilo triaceto nitrile product is in the range from about 35° to 100° C. When the process is carried out in cyclic fashion, yield of nitrile will probably be about 96 percent and with precautions in handling materials, it can be increased to a higher level, producing virtually the theoretical conversion of the hexamethylene tetramine to nitrilotriacetonitrile. By cyclic operation we mean recovering filtrate from a completed stage of reaction and returning it to the reaction vessel for subsequent additions to continue the reaction.

In the second stage of the process the washed recovered nitrilo triaceto nitrile is added to boiling sodium hydroxide solution, slowly, to give a clear solution of the trisodium salt of the acid. The free acid is recovered by adding sulfuric acid to the hydrolyzed solution. Nitrilo triacetic acid so prepared is of granular snow-white crystals, easily freed of mineral acid. It is generally easily isolated in at least about 96 percent yield.

For a better understanding, the following descriptions of the process as carried out in continuous, cyclic or batch style will serve:

EXAMPLE I (A) The initial charge in the reaction vessel consisted of 197 parts of liquid hydrogen cyanide (5.0 mols) 173 parts of 37 percent formaldehyde solution (2.3 mols) and 400 parts of water. This was acidified with 20 parts concentrated sulfuric acid to give a starting pH below about 1.

Hexamethylene tetramine to the amount of 35 parts (0.25 mol) was dissolved in 50 parts of water.

The reaction medium consisting of the hydrogen cyanide, formaldehyde, water and acid was established in a vessel of twice the nominal volume of the reactants and equipped with stirring device, thermometer, means for adding the hexamethylene tetramine, refrigerated reflux condenser for recovery of the hydrogen cyanide vapors and a heating mantle. The temperature of the solution was raised to about 44° C. The hexamethylene tetramine solution was added slowly, the rate actually being dependent on controlling temperature to avoid a runaway reaction, during which interval the temperature of the vessel rose to 58° C. The clear solution was heated to 68° C. and was held at that temperature for about 25 minutes, whereupon a heavy deposit of crystals appeared. After 15 minutes, further stirring at 68° C., the reaction mixture was cooled 15° C. and filtered carefully. The yield was 113 parts of snow white crystals of nitrilo triaceto nitrile, which melted at 126–127° C.

Easier reflux control is obtained if only about 20 percent of the hydrogen cyanide is added initially—the balance being added during the addition of amine condensate but being sure to complete the addition of the HCN before the amine condensate is completely added.

The procedure thus carried out may be considered typical of batch operation, or of conditions to be maintained for continuous operation, or a series of batches or cycles. Considerable liberty in pH may be permitted in that the absolute value need only be acid, but maximum yields are obtained at pH levels from 0 to about 1.

(B) The filtrate from the cycle designated (A) was combined with 120 parts of liquid hydrogen cyanide (3 mols) 114 parts of 37 percent aqueous formaldehyde (1.5 mols) and this reaction medium acidified to pH below about 1. Thereupon it was reacted with 35 parts hexamethylene tetramine (0.25 mol) in the manner described in cycle (A).

In this stage, also, addition of part of the hydrogen cyanide at first is helpful, but it is not as important as in the first stage, because the volume in the reaction vessel is larger.

The manipulation in the cyclical repetition of the process amounted to cooling the liquid from the preceding pass (678 parts pH 0.5) and returning it to the reaction vessel. Thereupon liquid hydrogen cyanide and formaldehyde makeup were added with stirring and such quantity of concentrated sulfuric acid as was dictated by the conditions added when necessary in order to reduce the pH to about 0.5–1.0.

The resulting solution was heated to 50–55° C. Then the hexamethylene tetramine solution was added during 11–25 minutes during which time the reaction temperature rose to 65–70° C. The reaction mixture was heated at 65–70° C. for another 20–30 minutes at the end of which time copious crystals had formed. The hot slurry was cooled and filtered as before, the mother liquor recycled, and the crystals washed in cold water and dried.

A summary of yields [1] for five cycles representing a typical sampling of the operation, is given below:

| Cycle | Wt., Parts | Percent of theory | Product M.P., degrees | Product Appearance |
|---|---|---|---|---|
| A | 113.0 | 84.4 | 126–127 | Snow-white, granular. |
| B | 125.7 | 93.8 | 125–127 | Do. |
| C | 122.2 | 91.1 | 125–127 | Do. |
| D | 116.6 | 87 | 125–127 | Do. |
| E | 114.8 | 85.6 | 125–127 | Do. |
| Overall | 592.3 | 88.4 | 126.127 | |

[1] Recovery can be increased through the use of formaldehyde having very low methanol content. The nitrile has appreciable solubility in methanol solution and loss of product occurs through solubility of the nitrile in the mother liquor, which increases in volume with each cycle.

The final mother liquor obtained after cycle E was pale yellow and quite readily adaptable to use in additional cycles F, etc.

(I) *Saponification of Nitrilotriacetonitrile to Acid Form*

Materials:
    Nitrilotriacetonitrile _____ 402 parts (3.0 mols).
    Sodium hydroxide _____ 97 percent.
    Pellets _____ 390 parts (0.45 mol).
    Water _____ 2.1 parts.

The sodium hydroxide was added to the water and the resulting solution heated to 70° C. Upon addition of 10 part portions of trinitrile, the temperature rapidly rose to 90° C. and to boiling. To the boiling solution was added trinitrile at a rate just sufficient to maintain the boil (45–60 minutes). The resulting clear light solution was boiled for two hours, with stirring, to drive off the ammonia that was formed.

(II) *Acidification of Trisodium Nitrilotriacetate*

Materials:
    1:1 (v./v.) sulfuric acid _____ 900 parts
    Alkaline solution from I.

The 1:1 sulfuric acid was placed in the vessel, and with stirring, the warm alkaline solution was added in a steady stream in about 15 minutes. The reaction mixture became heated during this step, but no attempt was made to cool the reaction. After stirring an additional hour, the slurry was allowed to cool overnight to ambient temperature of about 25° C. It was easily filtered and washed free of sulfate (filtrate tested with barium chloride solution) with cold (5° C.) water. After oven-drying overnight, the snow-white crystalline product weighed 551 parts, 96.4 percent of theoretical yield.

EXAMPLE II

For a typical batch operation, the following procedure may be used:

Combine in a glass-lined vessel—
    Sulfuric acid _____ 40 parts.
    Water _____ 400 parts.
    Hydrogen cyanide _____ 630 parts (3 percent in excess of theoretical).
    Formaldehyde (37 percent aqueous) _____ 564 parts (2 percent in excess of theoretical).

This reactant mixture is brought to reflux temperature, which is approximately 37° C. Reflux control may be effected by addition of hydrogen cyanide over a period of time, as pointed out in Example I.

To the reaction mixture is added slowly, over a 2-hour interval, a solution of 175 parts hexamethylene tetramine dissolved in 250 parts of water.

During the addition of this reaction material the temperature of the mixture gradually rises and after about 1½ hours the temperature will have risen to about 52° C., at which point white crystals form. With further addition and heating to 77° C. for several hours and no reflux of hydrogen cyanide, a yield of 637 parts of nitrilo triacetonitrile is separated. This represents a yield of 95.1 percent.

Ethylenediaminetetraacetonitrile as well as other nitriles of diamines, triamines, tetramines, etc., corresponding to multiples or polymers of the structure

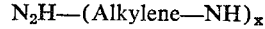

$x$ being an integer, and corresponding to the formula:

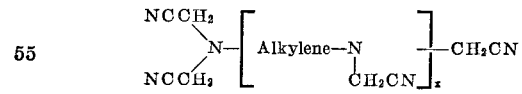

may be made in accordance with the process. Also, hydroxyethyl groups may replace H in the starting material; i.e., hydroxyethyl ethylene diamine; dihydroxyethyl ethylene diamine are useful. Fundamentally, the amine is reacted with the formaldehyde, or any formaldehyde yielding material, to form a condensation product to obtain a controlled reaction with excellent yields and virtually no significant amounts of by-products. It should be noted that the fundamental operation is to employ the formaldehyde, or the formaldehyde yielding substance, to form a condensation product in which a formaldehyde unit blocks the replaceable amino hydrogen positions before the amine is introduced into the reaction mixture. By virtue of the fact that the formaldehyde blocks the positions, it becomes available in the reaction mixture with additional formaldehyde when necessary to form the nitrile. Fundamentally, therefore, by forming the condensation product in advance under controlled conditions, the overall reaction is quite specifically directed to the formation of the principal product it is desired to produce.

The separate reaction of the amine with the aldehyde thus aids in reaction control, first, by reducing the possible number of side reactions; second, aids in controlling temperature by permitting separate development of the heat of condensation; and third, permits the use of a broader pH range in carrying out the reaction.

EXAMPLE III

A simple batch process is carried out as follows:

| | | |
|---|---|---|
| Ethylenediamine | mols | 1 |
| Formaldehyde 37 percent solution | do | 2 |
| Cold water or ice | parts | 100 |

The ice or cold water is added to the formaldehyde and the amine slowly added with stirring. The mix is cooled externally to keep it at room temperature. (The condensation product may be that formed with up to 4 mols of formaldehyde.)

This condensation product, obtained as a solution, is then added to a flask containing the following, at about 35° C.; two mols of formaldehyde, 37 to 50 percent aqueous solution, approxmately 2 parts of 96 percent sulfuric acid, and 4 mols of liquid hydrocyanic acid. Reflux control may be effected as pointed out in Example I.

The ethylenediamine-formaldehyde condensate is fed into the system at a rate such that excessive boiling is avoided. Immediately with addition of the condensate to this reaction medium, an exothermic reaction occurs and a precipitate of ethylenediaminetetraaceto nitrile is formed.

Ethylenediamine formaldehyde condensate is added steadily while maintaining the temperature in the preferred range, near 35° C., until one mol of ethylenediamine has been added. The rate of addition of the amine is controlled by the temperature it is desired to maintain and, hence, by the efficiency with which the reaction mixture can be cooled. Rate of addition is also controlled by pH. For best results the condensate should not be added so fast that the pH rises above about 1.0. In this fashion complete utilization of the hydrocyanic acid occurs with substantially quantitative yield of ethylenediaminetetraaceto nitrile.

It is possible to use a pressurized vessel and higher temperatures approaching 90 to 100° C., but it is preferable to avoid such temperature levels, becaue they result in somewhat reduced yields and the development of color in the reaction mixture. The process is, of course, best performed under pressure in a closed system to prevent excessive loss of the toxic volatile hydrocyanic acid. A cold finger type of reflux condenser is useful in minimizing pressurization of the equipment.

With completion of the addition of the ethylenediamine, filter the solution to remove the tetraaceto nitrile. It is then hydrolyzed with four mols of aqueous caustic alkali to form the tetra sodium salt of ethylenediaminetetraacetic acid. It may be kept and used as the nitrile.

In the case of ethylenediamine in Example III, 4 mols of $CH_2O$ may be added to form the condensation product. In this case the condensation product is added to an aqueous, acidified solution of HCN.

It may be of advantage to add 1 mol of $CH_2O$ per mol of primary amine to form a condensate, such as

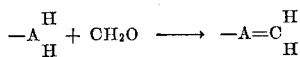

and to add the balance of the $CH_2O$ to the HCN solution so as to increase the reflux temperature.

With respect to temperature of operation, therefore, reflux for the given reaction medium is preferred. This indicates atmospheric pressure. If it is desired to operate above reflux temperature, pressures above atmospheric are indicated. This condition is readily developed by use of a closed system, or pipe, for the reaction and general pressurization of the equipment.

Though the invention has been described with reference to only a limited number of examples, its principles may be readily understood and it may be practiced with variations without departing from the spirit of the examples.

What is claimed is:

1. The method of preparing aceto nitrile compounds wherein the aceto nitrile group is attached to a tertiary amino nitrogen atom in a compound having a formula corresponding to the following:

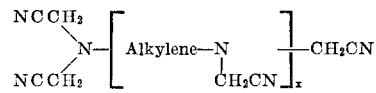

wherein up to two of the positions occupied by —$CH_2CN$ may be occupied by —$CH_2CH_2OH$ groups, wherein $x$ is an integer including 0 having a value up to 4, and alkylene is a lower alkylene group, the said method of preparing said aceto nitrile compounds comprising (a) establishing and maintaining a liquid phase reaction medium in a reaction zone containing liquid hydrogen cyanide and an amount of formaldehyde sufficient to provide the number of mols of formaldehyde stoichiometrically necessary to complete reaction of starting amino compound with formaldehyde, said starting amino compound being an amine-formaldehyde condensation product having no replaceable amino hydrogens attached to the nitrogen of said amine formaldehyde condensation product, (b) maintaining the pH of said medium at an acid level and adding said amine-formaldehyde condensation product at a rate such that all of the said amine formaldehyde condensation product is substantially immediately reacted as it is introduced into said reaction medium, thereby to form said aceto nitrile compound corresponding to the amine of the said amine-formaldehyde condensation product, and (c) separating said aceto nitrile compound which is formed.

2. The method of forming nitrilotriacetonitrile in accordance with claim 1 which comprises establishing said reaction medium containing a given volume of aqueous formaldehyde solution and liquid hydrogen cyanide, thereby to establish reaction medium of a given predetermined initial volume, acidifying said reaction medium to a level of pH below about 1, adding hexamethylenetetramine into said reaction medium at a rate to maintain the temperature of said reaction medium at about a slow reflux and maintaining approximately said predetermined initial volume of reactant aldehyde and cyanide during the addition of hexamethylenetetramine and removing precipitated nitrilotriaceto nitrile.

3. The method of making diethylene triamine aceto nitrile in accordance with claim 1 which comprises introducing diethylenetriamine-formaldehyde condensation product as a starting material having no replaceable amino hydrogens into said reaction medium at a rate such that substantially immediate reaction follows, maintaining the temperature of said medium below reflux temperature and removing corresponding precipitated aceto nitrile.

4. The method in accordance with claim 1 in which the amine-formaldehyde condensation product starting material is formed from ethylene diamine and formaldehyde.

5. The method in accordance with claim 1 in which the amine formaldehyde condensation product starting material is formed from hydroxyethylethylenediamine and formaldehyde.

6. The method in accordance with claim 1 in which the amine formaldehyde condensation product starting material is formed from dihydroxyethylethylene diamine and formaldehyde.

7. The method in accordance with claim 1 in which the amine formaldehyde condensation product starting material is formed from ammonia and formaldehyde.

References Cited in the file of this patent

UNITED STATES PATENTS

| | | |
|---|---|---|
| 2,205,995 | Ulrich et al. | June 25, 1940 |
| 2,405,966 | Loder | Aug. 20, 1946 |
| 2,816,129 | Montgomery | Dec. 10, 1957 |
| 2,855,428 | Singer et al. | Oct. 7, 1958 |

OTHER REFERENCES

Migrdichian: "The Chemistry of Organic Cyanogen Compounds," 1947, page 210.

Groggins: "Unit Processes in Organ Synthesis," 1952, page 373 (fourth edition).